United States Patent
Hounsel

[11] Patent Number: 6,143,107
[45] Date of Patent: Nov. 7, 2000

[54] HARD-FACED INSULATING REFRACTORY FIBER LININGS

[76] Inventor: Mack A. Hounsel, 12910 Rolling Valley, Cypress, Tex. 77429

[21] Appl. No.: 09/001,963

[22] Filed: Jan. 2, 1998

Related U.S. Application Data

[63] Continuation of application No. 08/743,277, Oct. 31, 1996, Pat. No. 5,759,663.

[51] Int. Cl.⁷ .................... B29C 65/00; E04B 1/80
[52] U.S. Cl. .................... 156/71; 156/62.6; 156/62.8; 156/304.3
[58] Field of Search ................ 52/454, 506.02, 52/509; 156/71, 62.6, 62.8, 304.3; 110/336

[56] References Cited

U.S. PATENT DOCUMENTS

| | | | |
|---|---|---|---|
| Re. 32,732 | 8/1988 | Sauder et al. | 227/140 |
| 1,824,091 | 9/1931 | Magee | 52/454 |
| 2,078,753 | 4/1937 | Christenson | 52/506.02 |
| 2,805,633 | 9/1957 | Naulin | 52/454 |
| 3,605,370 | 9/1971 | Prible | 52/622 |
| 3,819,468 | 6/1974 | Sauder et al. | 161/152 |
| 3,832,815 | 9/1974 | Balaz et al. | 53/227 |
| 3,930,916 | 1/1976 | Shelley | 156/71 |
| 3,952,470 | 4/1976 | Byrd | 52/509 |
| 3,990,203 | 11/1976 | Greaves | 52/227 |
| 3,993,237 | 11/1976 | Sauder et al. | 228/140 |
| 4,001,996 | 1/1977 | Byrd | 52/509 |
| 4,012,877 | 3/1977 | Byrd | 52/275 |
| 4,055,926 | 11/1977 | Byrd | 52/475 |
| 4,086,737 | 5/1978 | Byrd | 52/227 |
| 4,103,469 | 8/1978 | Byrd | 52/509 |
| 4,120,641 | 10/1978 | Myles | 432/3 |
| 4,123,886 | 11/1978 | Byrd | 52/509 |
| 4,154,975 | 5/1979 | Sauder | 13/25 |
| 4,177,616 | 12/1979 | Lampert | 52/509 |
| 4,194,282 | 3/1980 | Byrd | 29/451 |
| 4,218,962 | 8/1980 | Cunningham et al. | 93/84 R |
| 4,222,337 | 9/1980 | Christiansen | 110/336 |
| 4,222,338 | 9/1980 | Adams | 110/336 |
| 4,238,257 | 12/1980 | Remi et al. | 156/71 |
| 4,244,761 | 1/1981 | Remi et al. | 156/71 |
| 4,272,638 | 6/1981 | Cimochowski et al. | 13/25 |
| 4,287,839 | 9/1981 | Severin et al. | 110/331 |
| 4,318,259 | 3/1982 | Verheyden | 52/504 |
| 4,324,602 | 4/1982 | Davis et al. | 156/71 |
| 4,339,902 | 7/1982 | Cimochowski et al. | 52/506 |
| 4,341,916 | 7/1982 | Byrd, Jr. et al. | 373/128 |
| 4,379,382 | 4/1983 | Sauder | 52/506 |
| 4,381,634 | 5/1983 | Hounsel et al. | 52/506 |
| 4,411,621 | 10/1983 | Miller | 432/247 |
| 4,425,749 | 1/1984 | Parker | 52/509 |
| 4,429,504 | 2/1984 | Hounsel et al. | 52/506 |
| 4,439,175 | 3/1984 | Cimochowski et al. | 493/413 |
| 4,440,099 | 4/1984 | Brachet et al. | 110/336 |
| 4,443,509 | 4/1984 | Sauder | 428/336 |
| 4,449,345 | 5/1984 | Hounsel et al. | 52/806 |
| 4,481,746 | 11/1984 | Cimochowski et al. | 52/804 |
| 4,493,176 | 1/1985 | Cimochowski et al. | 52/508 |
| 4,494,295 | 1/1985 | Herring | 29/432 |
| 4,549,382 | 10/1985 | Byrd, Jr. et al. | 52/506 |
| 4,558,552 | 12/1985 | Reitter | 52/454 |
| 4,584,814 | 4/1986 | Hounsel et al. | 52/747 |
| 4,803,822 | 2/1989 | Deren | 52/506 |
| 4,835,831 | 6/1989 | Melton | 52/506.02 |

FOREIGN PATENT DOCUMENTS 2006613  10/1977  United Kingdom .

*Primary Examiner*—Steven D. Maki
*Attorney, Agent, or Firm*—Robert W. Strozier

[57] ABSTRACT

A high temperature, abrasion resistant insulating module is described having a sinuously folded, ceramic blanket with a lath covering three side of the folded blanket. The lath has doubled back portions extending into the folds of the blanket on it hot face. To the lathed front face of the folded blanket is applied a layer of thermally stable, abrasive resistant material which not only serves an as abrasion shield to the brittle fibrous material of the blanket, but only serves to stabilize the module and to reduce fiber dust.

10 Claims, 4 Drawing Sheets

HARD-FACED INSULATING REFRACTORY FIBER LININGS

This application is a Continuation application of U.S. patent application Ser. No. 08/743,277 filed Oct. 31, 1996 now issued as U.S. Pat. No. 5,759,663.

BACKGROUND OF THE INVENTION

1. Field of the Invention

This invention relates to an insulating refractory fiber linings having a hard outer layer or coating so that the insulating lining can be used in harsh environments without rapid deterioration of the hard, rigid layer material protecting the soft, resilient insulation material therebeneath.

More particularly, the present invention relates to an insulating lining which includes a mounting assembly for attachably engaging a surface to be lined, an ceramic fiber insulating layer, a mesh fixedly engaging the insulating layer and a hard face layer covering the mesh and anchored to the mesh by encapsulating or embedding a portion of the mesh, where the layer allows the lining to be use in harsh environments.

2. Brief Summary of Related Art

A number of United States patents have described insulators involving sinuously folded ceramic fiber blankets. U.S. Pat. No. 4,001,996 discloses a prefabricated insulating block formed of sinuously folded ceramic fiber blankets where the adjacent layers are needled together to intermingle the fibers in adjacent layers to form the block which then can be mounted on a surface.

U.S. Pat. No. 4,103,469 disclosed a modular fiber blanket furnace lining where the fiber blanket is sinuously layered to form a block structure and the hot surface includes a flexible cloth made from a continuous fiber of metal oxides to prevent erosion of the fiber making up the blanket due to high velocity furnace gases.

U.S. Pat. No. 4,123,886 disclosed a modular fiber blanket lining where the fiber blanket is sinuously layered to form a block structure and the hot face of the block is a high temperature ceramic fiber blanket or felt attached to the module by being sewn thereto.

U.S. Pat. No. 4,287,839 disclosed a lining including a plurality of insulating blocks of a insulating mat which is folded in a corrugated manner and possibly stitched in shape.

U.S. Pat. No. 4,339,902 disclosed a modular or block insulation composed of at least two layers of serpentine folded fibrous insulating blankets with the layers of the blankets being secured by means of extended folds of the hot face layers of blanket being interengaged with folds of the cold face blanket layers.

U.S. Pat. No. 4,595,358 disclosed an insulating material including a block with a sinuously layered ceramic fiber blanket having a thin sheet of stainless steel following the hot surface contour of the block and where folds of the sheet extend between adjacent layers of the blanket to form a tightly fit cover for storing heat and radiating the heat back to the heated product when thermal equilibrium is established.

Although insulating modular blocks of ceramic fibers for attachment to surfaces that are subjected to high temperatures are now well-known, these blocks generally are not successfully used in applications where the inherently soft fibrous hot face is subject to ablation by high velocity gases, erosion by abrasive particulate, deterioration due to fluxing or chemical attack. The relatively low emissivity of refractory fibers may be a detriment to efficient heat transfer in some applications. Fiber dust, unfiberized shot, or tramp fiber may also dislodge from the hot face and cause rejects in some applications. Efforts to use rigidizers or thin coatings to overcome these weaknesses have been generally unreliable because of insufficient strength of the adhesive bond directly to the fiber hot face. Thus, it would represent an advancement in the art to provide insulating linings which are capable of extended use in high temperature, highly abrasive and/or highly corrosive environments.

SUMMARY OF THE INVENTION

This invention provides a thermal insulating block or modular unit which includes a ceramic fibrous layer, a mounting assembly associated with a back or cold face of the block, a front or hot face and four side faces. The block further includes a means for anchoring which is affixed to a portion of the hot face of the block by a means for fastening. The block further includes a hard face outer layer anchored to a portion of the hot face of the block where the anchoring means is associated therewith, where the layer is designed to protect the fiber layer of the hot face harsh environments at elevated temperatures and change the physical properties of a portion or the entire hot face.

This invention also provides composite insulating modular units including at least two blocks as described above. The blocks are held together by a bonding layer interposed between a front face of one block and a back face of the second face where each face includes the anchoring means described above associated therewith. The bonding layer bonds the two blocks together by bondingly engaging the two opposing anchoring means. The front face of the second block can also have a means for anchoring associated therewith for anchoring an abrasion and/or corrosion resistant layer, while the back face of the first block and a back portion thereof have a means for mounting the composite modular unit to a surface associated therewith.

This invention further provides thermal insulating linings which include a plurality of insulating blocks or modules as described above where the abrasion resistant layer is then applied to the lining after the pluralities of blocks have been attached to a surface to be lined to form a continuous protective layer over any portion or the entire lining. Alternatively, the entire lining can have a structural support member associated with and extending over the combined hot faces of the plurality of blocks and anchored to each of the blocks. The protective layer would then be applied to the support member and to the anchoring means associated with each block.

This invention also provides a method for insulating a surface in a high temperature abrasive and/or corrosive environment including applying to the surface an insulating lining including a plurality of blocks and then applying to the combined surface thereof a protective covering or layer anchored to the anchoring means associated with each of the plurality of blocks.

This invention further provides a method for manufacturing the modular blocks and linings described above.

Moreover, the present invention provides a method for attaching a ceramic fiber block lining to a hard refractory lining by attaching a means for anchoring to a cold face of the block and then applying a bonding layer to the hard refractory lining and pressing the cold face of the block into the bonding layer on the hard refractory lining so that the bonding layer bondingly engages and anchors to the anchoring means.

BRIEF DESCRIPTION OF THE DRAWINGS

For a further understanding of the nature and objects of the present invention reference should be made to the following illustrative Drawings, in which, like parts are given like reference numerals and wherein.

DESCRIPTION OF THE PREFERRED EMBODIMENTS

Figure 1:
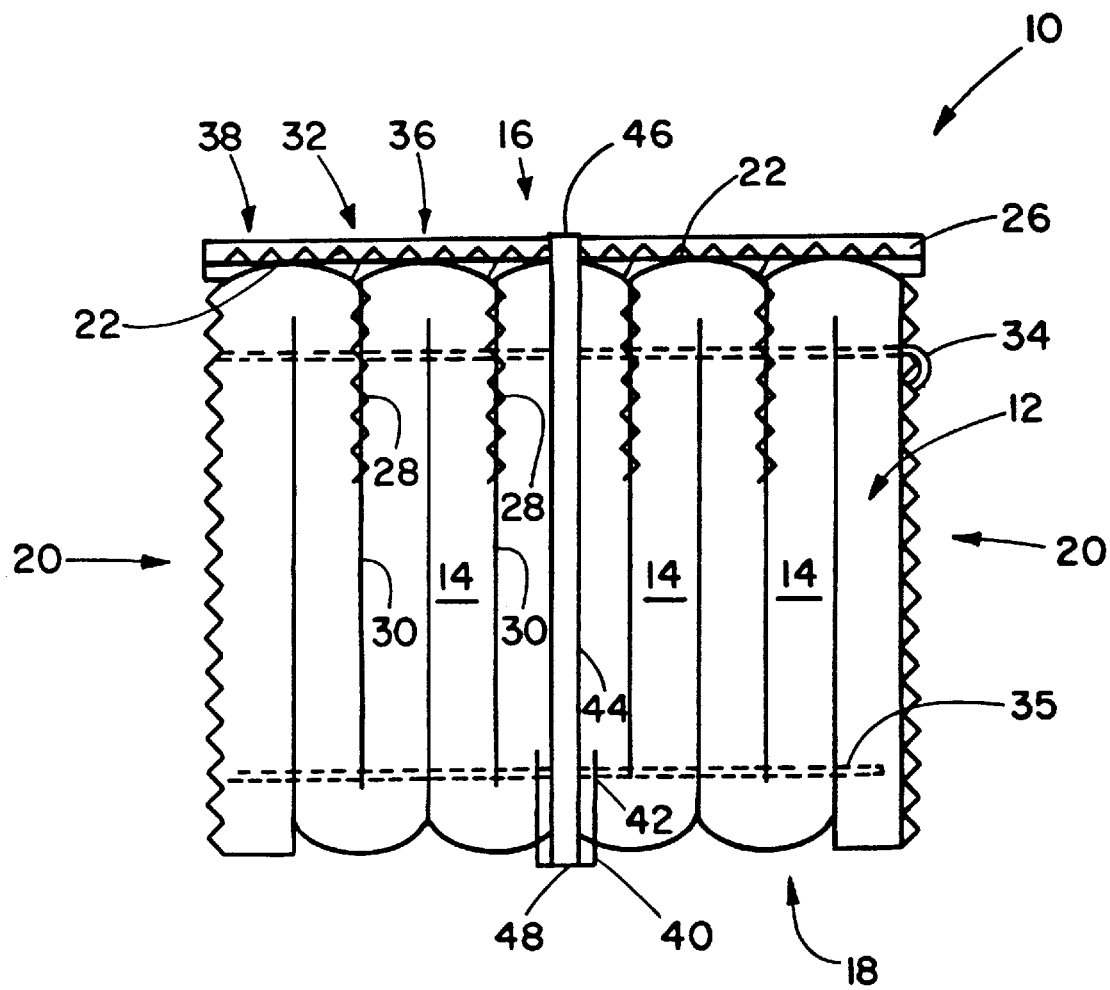
FIG. 1 is a schematic of a first embodiment of a module of the present invention.

The inventor has found that an insulating surface lining or covering can be constructed for use in high temperature, harsh environments. Generally, high temperature insulating linings are composed of ceramic fibrous materials. The integrity of these materials is not adequate for their effective use in high temperature, highly abrasion and/or corrosive environments. The present invention provides linings that can adequately survive in high temperature, harsh, highly abrasive and/or highly corrosive environments including, without limitation: (1) heat recovery steam generator ducts in co-generation plants, especially downstream of the turbines where gas velocities are very high (ablation); (2) fired heaters near decoking nozzles or in the convection sections where soot blowers are used to clean finned tubes (erosion by particulates); (3) near high combustion velocity burners (ablation and erosion); or (4) incinerators where erosion and chemical contamination or fluxing can deteriorate unprotected insulating ceramic fiber linings. The present linings are able to work in these environments because the linings include a hard, dense layer such as an abrasion resistant layer that protects the delicate ceramic fibrous insulating material and is capable of maintaining its structural, physical and/or chemical integrity at elevated temperatures and in highly abrasive and/or corrosive environments for extended periods of time. One additional benefit of the present invention is that layers of different types of materials can be effectively and economically secured to ceramic fiber block insulating modules which can impart abrasion resistance, corrosion resistance, high emissivity, dust reducing properties or any combination thereof to any part, portion or region of the lining or block hot faces.

Broadly, the present invention provides hard-faced, insulating linings having a hot surface layer which can impart a desired property or set of properties to the lining where the properties can include, abrasion resistance, ablation resistance, high emissivity, corrosion and/or chemical resistance, high mechanical strength, or other surface properties not inherent to ceramic fibrous insulation.

More particularly, the present invention provides a design for an insulating modular block having a refractory or ceramic fibrous insulation layer preferably comprising a blanket, mat or sheet arranged in a closely packed layered arrangement and preferably layered in a sinuous manner to form a block. The packed layered arrangement could also comprise closely packed individual sections of sheets or singly folded sections of sheets.

Associated with the hot surface of the insulation layer is a lath such that the lath conforms to the front face configuration of the insulating layer with portions of the lath extending into the layer, e.g., for insulating layers comprising closely packed layered insulating blankets the extending portions of the lath can be insert between layers of the blanket or into the folds of the blanket or sheet. The lath is secured into the insulating layer by a means of securing or fastening such as J-pins, rods, tubes, or any other means for securing that can be inserted into the insulating layer and securably engage the portions of the lath that extend into the insulating layer.

The blocks also include a mounting assembly associated with a back or cold face and a back portion of the block. The mounting assembly generally includes a mount for attachably engaging a mount receptacle associated with a surface to be lined. The mount is held in place by a set of J-pins, rods, tubes or tubular beams inserted into the insulating layer and through holes in the mount. The mounting assembly also includes a tube extending through a center of the block from the front face to the back face aligned with a hole in the mount. The tube, preferably made of plastic and removable, allows an installer to align the mount with its receptacle on the surface to be lined and insert a means for engaging associated with the receptacle into the hole in the mount and a means for locking secures the engaging means of the receptacle to the mount.

Preferably, the mount is a flatted U-shaped metal bracket with a center hole therethrough and the receptacle is a threaded stud anchored to the surface. The block is aligned with the stud and the stud is inserted through the hole in the bracket and a nut is inserted through the tube in the block and threaded onto the stud to secure the block in place. Of course, other mounting assemblies can be used as well such as a tongue and groove, interlocking slide channels and engagement washers. Other mounting mechanisms are also known in the art and can be used to secure the block to the surface to be lined such as quick connects or the like. Other mounting assemblies are disclosed in the following U.S. Pat. Nos. 4,803,822, 4,120,641, 4,379,382, 4,443,509, 3,993,237, Re. 32,732, 3,819,468, 4,154,975 and 3,832,815, incorporated herein by reference.

The lath is designed not to impede the natural resilience, compression or expansion of the block during manufacturing or installation. Thus, the lath is preferably constructed of an open-weave which has give. Alternatively, the lath can be constructed of a plurality of more rigid structures anchored into the insulating layers with sufficient gaps or overlaps to allow for thermal expansion and contraction without imparting stress to the insulating layer or to a hard face layer applied thereto. The lath also provides an grid for anchoring of the hard-face layer over any portion of the hot face including substantially the entire lathed surface of the fiber block.

The hard face layer is designed to protect the fiber block from coming into direct contact with materials that can damage the fiber block such as highly abrasive materials, highly corrosive materials, and other damaging materials. The layer is preferably a curable mortar material which can be pressed into the front surface of the lathed block so that the mortar extends below the lath and interlocks to embed the lath. Upon curing, the layer such as an abrasion resistant layer is secured to the block by the material that is forced through the lath grid and interlocks to embed the lath. The hard face could also be a wet fiber moldable material such as Unifrax' Top Coat 2600 or other similar refractory fiber moldables.

Optionally, the lath can also extend down the sides of the block and the layer can be applied to the sides of the block so that the block is protected on five sides. Additionally, the entire layered fiber block can be lathed and encased in the abrasion resistant layer material to form brick like structures that can be anchored to a surface.

Preferably, the lath is a knitted or chain linked mesh of a high temperature material such as a metal or a ceramic yarn conforming to the hot face of the fiber block and anchored to the fiber block as described above. However, the lath can also be attached to the fiber block without the portions extending into the layer by simply using a plurality of arcuate spearing means as described in U.S. Pat. No. 4,341,916, incorporated herein by reference.

The lath has many advantages for securing the hard-face to the fiber block. First, the lath is secured in a manner similar to the manner in which the mounting assembly is secured to the block. Second, unlike the direct application of a hard-face to the fiber block which is subject to rapid delamination and deattachment due to poor structural integrity at the hard-face-block interface, the lath which is firmly secured to the block acts as an open grid for the hard-face material to be pushed through resulting in portions of the lath actually being embedded in the hard-face material after curing.

Not only can the lath be used to anchor a surface modification layer onto the hot face of a fiber block, the lath can also be used to allow bonding of fiber blocks to different types of linings. Thus, a fiber block can be bonding to a hard refractory lining (a difficult task for direct bonding due to service bonding failure) by affixing a lath to the fiber block cold face so that the bonding layer will mechanically embed a portion of the lath and more securely hold the fiber block to the hard refractory lining surface. This type of composite lining construction could find use in reconditioning or upgrading old furnace linings. Additionally, any number of fiber blocks could be bonded together using this technique to make composite modules.

This invention further provides linings which includes a plurality of insulating blocks or modules described above configured to conform to a structure to be lined. The lining can then have a member attached to the laths of the hot faces of each module and extending over any portion of the combined hot face of the lining. The member could be of a stiffer construction and highly perforated so that the hard-face material can be applied to the member and pushed through the perforations into the lathed hot faces of each block to form a composite and reinforced hard face layer for use in very aggressive environments.

Generally, when forming a lining out of the individual blocks, the blocks are secured to the surface to be lined. Then, in between soldier coursed rows of modules, a batten strip of the same fibrous material is inserted. Typically, the inserts are sections of folded blanket that conform to the dimension of the blocks. Once the entire lining is constructed or when to adjacent blocks are secured to the surface with the insert therebetween, the compression bands can be removed which allows the blocks to expand and securely interface with one another and the inserts.

Referring now to FIG. 1, there is shown an insulating module or block 10 of the present invention which includes an insulating blanket 12 made of a high temperature, refractory or ceramic fibrous material. The block 10 is preformed by folding the insulating blanket 12 in a sinuous manner to form a plurality of adjacent layers 14 of substantially equal length. The block 10 includes a front or hot face 16, a back or cold face 18 and four side faces 20. Further details of the sinuously folded insulating blankets and modules made therefrom can be found in U.S. Pat. Nos. 3,952,470, 4,001, 996, 4,103,469, 4,123,886, 4,086,737, 4.005,926, 4,218,926, 4,194,282, 4,493,176, 4,339,902, 4,439,175, 4,481,746, 4,341,196, 4,381,634, 4,449,345, 4,429,504, 4,584,814, and 4,549,382 which are incorporated herein by reference. It should also be recognized that any layered blanket, mat, fiber, monolith, felt or sheet structure commonly used in the art of making insulating fiber block can be used as well.

The sinuously layered blanket 12 is arranged in the block 10 so that the front face 16 of the block 10 includes co-extending curved outer surfaces 22 of adjacent layers 14 of the blanket 12. Disposed on the curved outer surfaces 22 is a lath 24, preferably of a woven, or knitted or chain linked high temperature material. Lockingly engaging a portion the lath 24 is an abrasion resistance hot face layer 26. The hot face layer 26 can be designed to change the surface property of a fiber block to impart a desired surface properties such as abrasion resistance or ablation resistance and to protect the blanket material from potential damage due to bombardment by abrasive materials entrained in the gases in certain furnace environments.

Generally, the lath 24 is a loosely woven mesh so that the blanket 12 can be compressed during manufacturing with compression bands as is well known in the art and can expand during installation when the compression band are removed and the blanket material is pounded out to encourage expansion. The open weave of the mesh also allows the blanket to freely undergo known thermally induced changes at the hot face without damaging the fibrous material. Additionally, the weave should be sufficiently coarse so that the material that makes up the hard face layer, such as an abrasion resistant layer, call be forced through the mesh to embed the mesh or a portion thereof after curing which embedding acts to secure the layer 26 to the hot face 16 of the block 10.

The lath 24 substantially covers the front face 16 of the block 10 made of the coextensive surfaces 22 of the layers 14 and preferably has doubled back portions 28 that extend a distance D into folds 30 of adjacent layers 14 to create an anchoring surface 32 associated with the curved surfaces 22 that make up the front face 16 of the block 10. The lath 24 can also extend down the complete length of two opposite side faces 20. Moreover, the lath 24 could extend all the way down to the module mounting hardware. The lath 24 is held in place by a plurality of J-pins 34 which extend through the layers 14 of the block 10 and through the doubled back portions 28 of the lath 24. The distance D of the extension of the lath into the folds of the sinuously layered block, can be any desired distance provided the distance extends into the folds a sufficient distance for the J-pins (rods, tubes or the like) to effectively hold the lath in place and not pull out of the blanket. Of course, the distance D is generally less than the depth of the folds. Preferably, the distance D is between about 2" to about 4", with between about 2.5" and 3.5" being preferred and about 3" being particularly preferred. However, the distance D could extend through to the back face of the block if desired, and be engaged by the module attachment hardware beams.

The layer 26 is composed of a material that can be applied to the anchoring surface 32 so that the layer 26 covers a portion 36 of the surface 32 and the material making up the layer 26 encases a portion 38 of the lath 24 disposed on the surface 32. Preferably, the layer 26 covers substantially all of the surface 32 and the material of the layer 26 encases substantially all of the lath 24.

Alternatively, the lath 24 can be extended down all of the side faces 20 of the block 10 and the layer 26 can be applied on the front face 16 and the side faces 20 so that all but the back face 18 is protected by the layer 26.

The block 10 also includes a mounting assembly having a mount 40 anchored to the block 10 by a plurality of beams 35 extending through the layers 14 and holes 42 in the mount 40 and a access tube 44 extending through a center 46 of the block 10 from the front face 16 to the mount 40. The mount 40 has a center hole 48 therethrough and aligned with the tube 44. As described previously, the mount 40 is designed so that a threaded stud on the surface to be lined can be insert through the hole 48. A nut or other securing device can then be inserted down the tube 44 and threaded onto the stud to secure the block to the surface.

Figure 2:
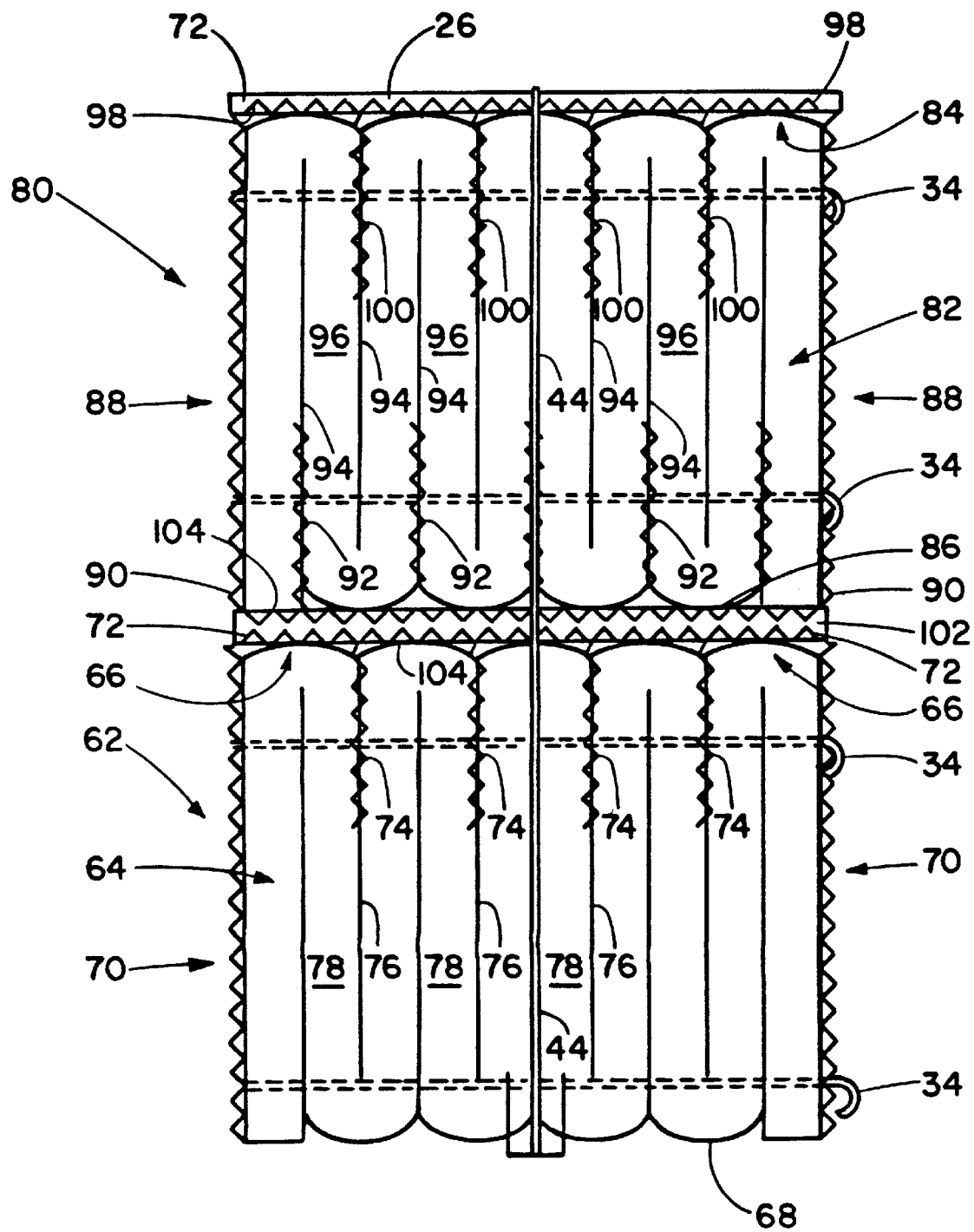
FIG. 2 is a schematic of a second embodiment of a module of the present invention.

Referring now to FIG. 2, a composite insulating block 60 is shown which includes a first block 62 comprising a first sinuously layered, ceramic fibrous blanket 64, a front face 66, a back face 68 and four side faces 70. The composite block 60 also includes a first lath 72 associates with the front face 66 of the first blanket 64 where the first lath 72 has doubled back extension portions 74 which extend into folds 76 of layers 78 of the first blanket 64. Of course, the extension portions 74 can also be separate members fixedly attached to the 20 lath. This same technique could be used to bond an insulating fiber block directly to the hot face of a hard refractory lining as described previously.

The composite block 60 also includes a second fiber block 80 comprising a second sinuously layered, ceramic fibrous blanket 82, a front face 84, a back face 86 and four side faces 88. The block 60 also includes a second lath 90 associated with the back face 86 of the second blanket 82 where the second lath 90 has doubled back extension portions 92 which extend into folds 94 of layers 96 of the second blanket 82. The block 60 also includes a third lath 98 associates with the front face 84 of the second blanket 82 where the third lath 98 has doubled back extension portions 100 which extend into the folds 94 of the layers 96 of the second blanket 82. The abrasion resistant layer 26 is then applied to the third lath 98. As describe above, the laths 72, 90, and 98 are held in place by a plurality of J-pins 34.

The block 60 also includes a bonding layer 102 interposed between the front face 66 of the first blanket 64 and the back face 86 of the second blanket 82. The bonding layer 102 is designed to anchor to the laths 72 and 90 by encasing portions 104 of the laths 72 and 90.

Figure 3A:
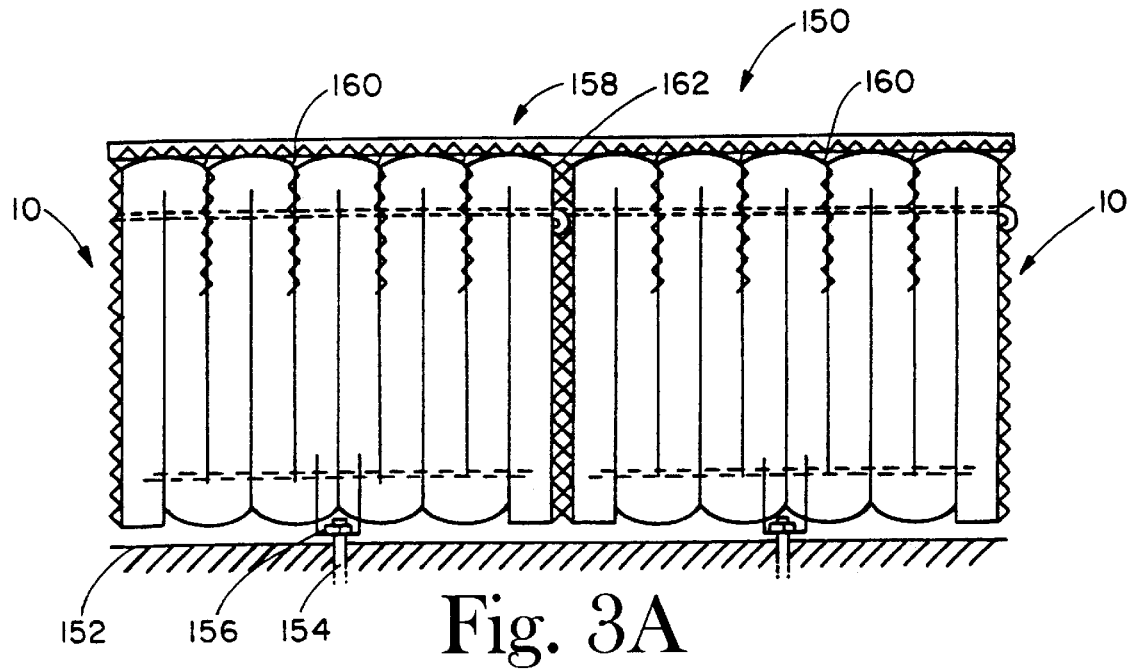
FIG. 3a is a schematic of a section of a first embodiment of a lining using modules of FIG. 1.

Referring now to FIG. 3a, an insulating lining 150 of the present invention is shown. The structure 150 includes a plurality of blocks 10 of FIG. 1. The blocks 10 are shown secured to a surface 152 by studs 154 and nuts 156. The layer 26 is now associated with the complete surface 158 of the plurality of blocks 10. The layer 26 can be seen to penetrate into valleys 160 between the curved surfaces 22 of the layers 14 as was the case in FIGS. 1 and 2. Additionally, the layer 26 extends some distance into vallay 162 between the two adjacent blocks 10. It should also be recognized that the layer 26 does not have to be continuous, but can be associated with any portion or portions of the surface. Additionally, the layer 26 can be a compound layer made up of different resistant materials or simply multiple layers of the same material.

Figure 3B:
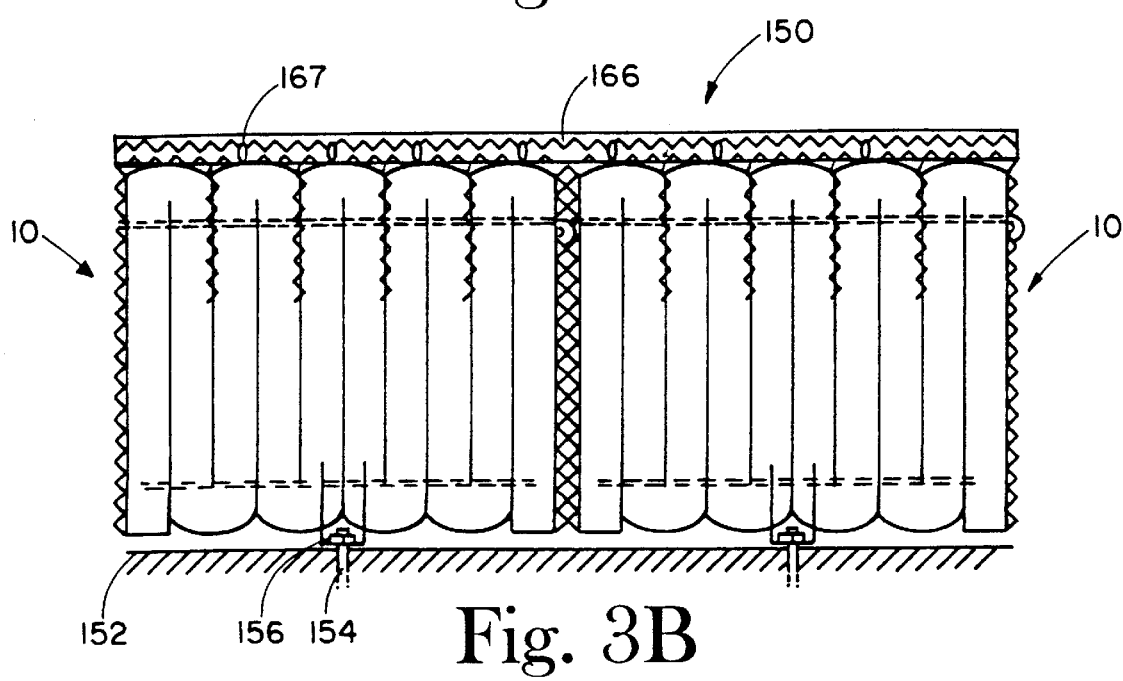
FIG. 3b is a schematic of a section of a second embodiment of a lining using modules of FIG. 1.

Alternatively, the lining 150 can include a second lath 166 attached to the laths 74 of the front faces 16 of the blocks 10 by attachment devices 167 (rings here) as shown in FIG. 3b. Of course, the attachment device can be any device that will hold the second lath 166 in place before the layer 26 is applied. The second lath 166 can be of a heavier construction to add structural reinforcement to the layer 26. The layer 26 can then be applied so that the material extends through the lath 166 or portions thereof and through the laths 24 of each block securing the layer 26 and the second lath 166 bondingly to the blocks 10.

Yet, another alternative for a lining of the present invention includes a plurality of blocks 10 and/or 60 as described above having the hard layer 26 already attached to the block, and then having an over layer applied to the entire lining to hold the lining together and to protect all exposed or potentially exposed areas of the blanket material.

Figure 4:
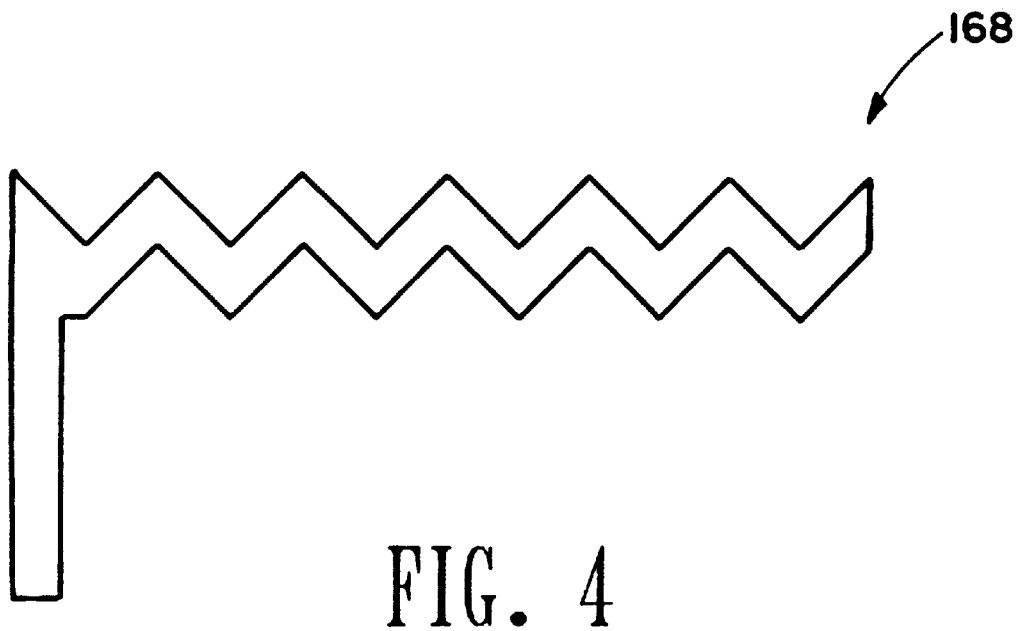
FIG. 4 is a cross-sectional view of an anchoring means.

Besides using a continuous open-weave mesh lath, the means for anchoring the layer 26 to the blocks 10 or 60 could be a more rigid L-shaped perforated member such as 168 shown in FIG. 4. The member 168 is designed to be inserted into the folds of the blanket similar to the portions of the lath that extend into the folds of the blanket. The member 168 is also designed to be held in place by J-pins 34.

Figure 5:
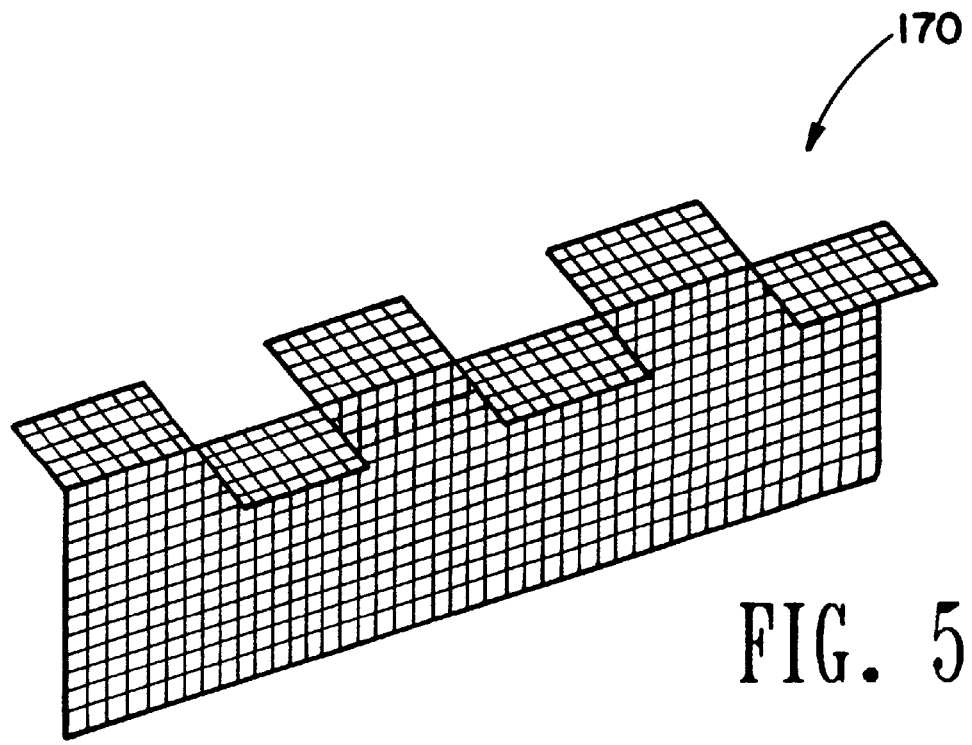
FIG. 5 is a cross-sectional view of another anchoring means.

Another anchoring means 170 is shown in FIG. 5, where the means 170 is a rigid lath, discontinuous T-shaped element that would not conform to the surface as a mesh anchoring means would. Of course, any L-shaped or T-shaped or U-shaped rigid element could be used provide that the element was perforated so that the material comprising the layer 26 can be force through the perforations to encase or embed the elements.

Suitable high temperature ceramic fibrous material include, without limitation, such as alumina-silicas, chromia-alumina-silicas, alumina-silica-zirconias compositions, mullite, aluminas or the like.

Suitable lath material includes, without limitation, woven wire cloth, a knitted metal mesh, a perforated expanded metal or a knitted or open-weaved ceramic textile or a perforated ceramic or ceramic fiber reinforced composite with metal meshes being preferred for applications where the temperature is less than about 2000° F. and ceramic meshes being preferred for applications where the temperature is greater than about 2000° F. The preferred metal mesh is stainless steel or other oxidation resistant, high temperature metals or alloys, but other high heat stable metals such as Kanthal APM can be used as well. The preferred ceramic fibers include alumina textile fibers, silica textile fibers, boron-nitride textile fibers, Nextel 312,440 or 610 fibers from 3M or other compositions also available from 3M. The knitted wire mesh is available in various mesh densities, wire diameters and alloys. A single ply of 60 density, 0.011" diameter wire knitted mesh, such as Inconel 601 available from Metex, is ideal. Knitted wire meshes with more plies, higher density and different diameter wires could also be used provided the material used to make the abrasion resistant layer can be pressed through the mesh to encase and embed a portion of the mesh associated with the exposed surface of the block. Not only does the mesh, metal or ceramic, help to add structure integrity to the abrasion resistant layer, the openness of the mesh also allows the hard face material to easily flow through the mesh during application so that a portion of the mesh becomes encased in the hard face material after curing. When using ceramic textile fibers, the ceramic textiles are preferably coated with a chemical resistant coating to protect the fibers from reacting with the agents that make up the hard facing barrier before curing. Such coating could be as simple as a wax or plastic coating or as complex as a multilayer chemical resistant coating.

Suitable material for making the hard facing layer includes, without limitation, mortars which have high thermal stability and have good abrasion resistance. These mortar materials can be applied either by conventional troweling techniques, gunning techniques or spraying techniques. The mortars can either be air, heat or chemically curable with air curable systems such as AA-22 from Resco being preferred. The mortar must be able to be easily applied to the lathed surface of the blocks and must harden to an abrasion resistant layer. The layer also acts to lend structural stability to the entire structure. If the layer is disposed on the entire exposed hot face of the lining, then the layer can also act to reduce the loss of fiber dust, tramp fiber, or shot during standard operations. Generally, the material is applied to the block in a thickness between about 1/16" to about 1½", with thicknesses of about 1/8" to about ¾" being preferred, and thicknesses of about 1/8" to about ½" being particularly preferred. However, thinner and thicker layers can be used with very thick layers being useful in severe environments.

Suitable high emissivity materials include, without limitation, ceramic coatings containing chromium oxide, ceramic coatings containing silicone carbide, and ceramic coating containing cerium oxide or mixtures thereof.

One additional use of the lathed fiber blocks of the present invention is in (he production of fiber blankets with reduced fragmentation and dusting problems. Thus, a hard face material could be applied and anchored to the hot face or front face of the block to reduce fragmentation and dust problems. In fact, the entire block could be lathed and encased in a dust inhibiting coating. Such blocks including a dust inhibiting layer anchored to the block could find use in so-called clean ovens, furnaces or heaters.

Additional advantages and modifications will readily occur to those skilled in the art. the invention in its broader aspects is therefore, not limited to the specific details and the illustrative examples as shown and described.

What is claimed is:

1. A method of making a composite insulating block comprising:
   a. anchoring a lath to at least a portion of a hot face of a first insulating block;
   b. anchoring a lath to at least a portion of a hot face of a second insulating block and a portion of a cold face of the second insulating block;
   c. interposing a bonding layer between the first block hot face and the second block cold face; and
   d. applying a hard layer to the second block hot face.

2. The method of claim 1, wherein the hard layer is an abrasion resistant layer, a high emissitivity layer, a corrosion resistant layer, a chemical resistant layer, a low porosity, encapsulating layer, a high mechanical strength layer, an ablation resistant layer or a combination thereof.

3. The method of claim 1, wherein the hard layer is a curable mortar material, wet fiber moldable material, ceramic coating containing chromium oxide, ceramic coating containing silicone carbide, ceramic coating containing cerium oxide or mixtures thereof.

4. The method of claim 1, wherein the insulating block is a ceramic fibrous material.

5. The method of claim 4, wherein the ceramic fibrous material is a blanket, mat, felt, individual sections of sheet, sheets singularly folded, or a combination thereof.

6. The method of claim 1, wherein the lath is a woven wire cloth, knitted metal mesh, perforated expanded metal, knitted open weave ceramic textile, perforated ceramic, ceramic fibers, or mixtures thereof.

7. The method of claim 1, wherein the lath is secured to the insulating blocks by a plurality of rigid structures anchored into the insulating layer.

8. A method of forming a lining comprising:
   securing a plurality of composite blocks to a surface to be lined where the blocks comprise a first insulating layer, a first lath associated with a portion of a hot face of the first insulating layer, a second insulating layer, a second lath associated with a portion of a cold face of the second insulating layer, a bonding layer interposed between the first block hot face and the second block cold face.

9. The method of claim 8, wherein the lathes are woven wire cloth, knitted metal mesh, perforated expanded metal, knitted open weave ceramic textile, perforated ceramic, ceramic fibers, or mixtures thereof.

10. The method of claim 8 wherein the second insulating layer further includes a third lath associated with a portion of a hot face of the second insulating layer and a hard layer anchored to the second layer hot face.

* * * * *